(12) United States Patent
Holme et al.

(10) Patent No.: US 8,215,461 B2
(45) Date of Patent: Jul. 10, 2012

(54) PAD ASSEMBLY FOR USE IN A DISC BRAKE

(75) Inventors: John David Holme, Crick (GB); Philip Ferdani, Whaley Bridge (GB); Nanoo Patel, Kingswinford (GB)

(73) Assignee: Federal-Mogul Friction Products Limited, Derbyshire (GB)

( * ) Notice: Subject to any disclaimer, the term of this patent is extended or adjusted under 35 U.S.C. 154(b) by 950 days.

(21) Appl. No.: 12/094,829

(22) PCT Filed: Nov. 15, 2006

(86) PCT No.: PCT/GB2006/004238
§ 371 (c)(1),
(2), (4) Date: May 23, 2008

(87) PCT Pub. No.: WO2007/060391
PCT Pub. Date: May 31, 2007

(65) Prior Publication Data
US 2008/0257664 A1    Oct. 23, 2008

(30) Foreign Application Priority Data
Nov. 24, 2005   (GB) .................................. 0523858.9

(51) Int. Cl.
*F16D 69/00*   (2006.01)
(52) U.S. Cl. .................................. 188/250 G; 188/258
(58) Field of Classification Search .............. 188/250 G, 188/250 F, 250 B, 250 E, 258, 73.1
See application file for complete search history.

(56) References Cited

U.S. PATENT DOCUMENTS

| | | | | |
|---|---|---|---|---|
| 2,943,713 A | * | 7/1960 | Salak et al. | 188/251 R |
| 4,535,874 A | * | 8/1985 | Pollinger et al. | 188/73.1 |
| 4,640,390 A | | 2/1987 | Saumweber et al. | |
| 5,538,108 A | | 7/1996 | Russo | |
| 5,934,418 A | * | 8/1999 | Wirth | 188/73.1 |
| 7,051,847 B2 | * | 5/2006 | Wirth | 188/250 G |
| 2003/0234149 A1 | | 12/2003 | Petersheim et al. | |

FOREIGN PATENT DOCUMENTS

| | | |
|---|---|---|
| DE | 85 14 607.2 | 8/1985 |
| DE | 298 21 113 U1 | 4/1999 |
| EP | 0 263 752 A2 | 4/1988 |
| EP | 0 624 735 A1 | 11/1994 |
| EP | 1318321 A1 * | 6/2003 |
| WO | WO 02073059 * | 9/2002 |

* cited by examiner

*Primary Examiner* — Xuan Lan Nguyen
(74) *Attorney, Agent, or Firm* — Robert L. Stearns; Dickinson Wright, PLLC

(57) ABSTRACT

A pad assembly includes a carrier plate, a backing plate to one side of which is secured at least one friction pad and which is mounted on its alternate side on the carrier plate, a spring acting between the carrier plate and the backing plate and allowing for limited rocking and/or linear movement of the backing plate relative to the carrier plate against the action of the spring. A plurality of transmitting members are secured to one or the other of the carrier plate or the backing plate and project to engage the other so as to enable the transmission of force between the two plates. The arrangement of the force transmitting members is such that at least two of the force transmitting members are generally equiangularly arranged about the geometric center of the carrier plate.

11 Claims, 3 Drawing Sheets

PAD ASSEMBLY FOR USE IN A DISC BRAKE

BACKGROUND OF THE INVENTION

1. Technical Field

Figure 1:
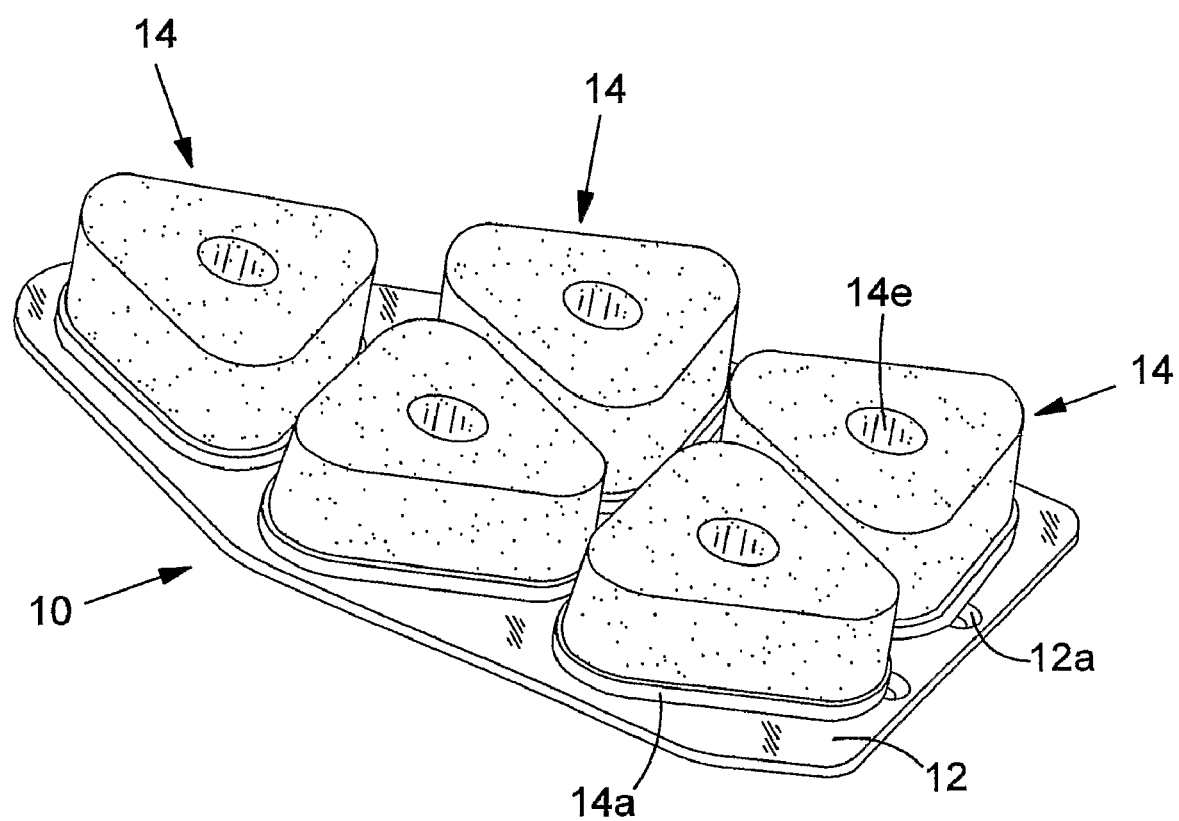

This invention is concerned with a pad assembly for use in a disc brake.

2. Related Art

Disc brakes are well known and operate by bringing pads into engagement with opposite sides of a disc to bring about deceleration of the disc. Thus, a typical disc brake has at least one pad mounted on each side of the disc and means for moving the pads towards the disc. The term "pad assembly" is used herein to mean an arrangement with one or more pads mounted on a common carrier plate.

In order to improve the engagement between the pads and the disc and to reduce uneven wear of the pads and/or the disc, some disc brakes, for example for use on railway vehicles, provide that the pads are mounted on the carrier plate in such a way that they can make limited movement relative to the carrier plate to enable them to "conform" better to the disc. Specifically, the pad may be mounted so that it can tilt, pivot or rock to bring its disc-engaging surface parallel to the surface of the disc. Where there are a plurality of pads, they may be mounted so that they can move towards or away from a carrier plate so that the pads all engage the disc. Examples can be found in U.S. Pat. No. 5,934,418 and German utility model number 2982113.

Another example is described in EP 1318321A which discloses a pad assembly in which pads are mounted on the carrier plate by means of a headed fastener. Each pad comprises a block of friction material mounted on a backing plate. The headed fastener is fixed to the carrier plate and passes through a hole in the backing plate of the pad and the head is on the opposite side of the backing plate from the carrier plate so that the head prevents the pad from becoming detached from the carrier plate. The backing plate is a relatively loose fit on the headed fastener so that the pad can make limited movements relative to the carrier plate. The limited movements can be a rocking, tilting or pivoting movements or may be linear movements towards the carrier plate or may be a combination of such movements. The limited relative movements enable the pad to conform more accurately to the surface of the disc. These relative movements take place against the action of spring means which is provided by resilient tongues projecting from the carrier plate and engaging in shallow recesses formed in the backing plate. The tongues are pre-tensioned against the backing plate by the headed fastener.

In the pad assembly which is disclosed in EP 1318321, the braking force, which is applied by the disc to each pad during braking, is transmitted by the backing plate of the pad to the resilient tongues of the carrier plate. This arrangement is unsatisfactory because in certain circumstances very considerable stress is applied to the tongues which can cause cracking at their junction with the remainder of the carrier plate.

A further, more complex arrangement shown in EP0263752 discloses an arrangement whereby a backing plate on which a number of brake pads are mounted is subsequently mounted adjacent a carrier plate by means of a substantially central spring-biased mounting. Additionally, there is provided a pair of bores, one in the backing plate, and one in the carrier plate which can be aligned to allow for an indexing pin to be received in both to prevent rotation of the backing plate relative to the carrier plate. However, it is clear from this document that the central spring-biased mounting carries substantially all the load when the brake pads engage against the friction surface to give rise to a braking effect, as is the case in all other prior art carrier plate/backing plate arrangements, and that the provision of an indexing pin is merely to prevent relative rotation.

SUMMARY OF THE INVENTION

It is an object of the present invention to provide a pad assembly in which the above mentioned cracking problem is reduced or eliminated.

In the pad assembly according to the invention, the braking force applied to the pad is transmitted to the carrier plate by virtue of the force transmitting members, ideally in the form of symmetrically arranged pins fixed to the carrier plate, and thus such force, or the majority of it, does not pass through the spring. Each pin is preferably cylindrical but may have another shape.

The provision of the force transmitting members reduces the stress on the spring means thus reducing the possibility of cracking. Additionally, the spring means can therefore be designed to operate more efficiently as a spring since it is not required to carry out the function of force transmission. This enables more efficient spring means to be provided and also gives the possibility of using spring means with different spring characteristics in different parts of the assembly. In particular, the spring means can be made more resistant to the high temperatures sometimes encountered during braking.

The backing plate may be mounted on the carrier plate by means of a fastener fixed to the carrier plate, the fastener projecting through a hole in the backing plate and having a head on the other side thereof, such as a rivet. In this case, the spring means may comprise one or more conical spring washers encircling said fastener. Alternatively, the spring means may comprise one or more conical spring washers encircling each force transmitting member so that the washers are retained by the force transmitting members. These conical spring washers may be of the type known as "Belleville" washers. Each fastener or force transmitting member may retain one or a stack of two or more such washers.

Where the pad assembly comprises a plurality of backing plates each having a friction pad mounted thereon, and in turn being mounted on a common carrier plate, the spring means may have spring characteristics appropriate to its position on the carrier plate, ie the spring means for some of the backing pads may be stiffer than those of others. For example, a pad provided on a backing plate at a leading or trailing edge of the carrier plate may have less stiff spring means than the remainder of the pads on later or more rearward facing backing plates.

THE DRAWINGS

There now follows a detailed description, to be read with reference to the accompanying drawings, of two pad assemblies which are illustrative of the invention.

Figure 2:
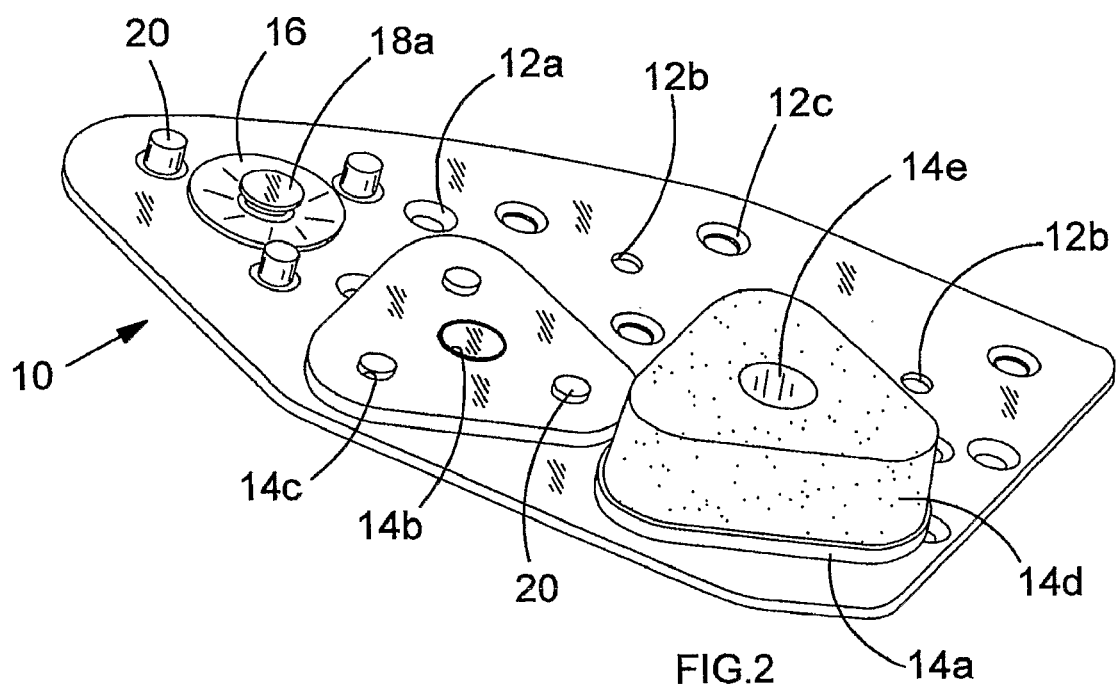
Figure 3:
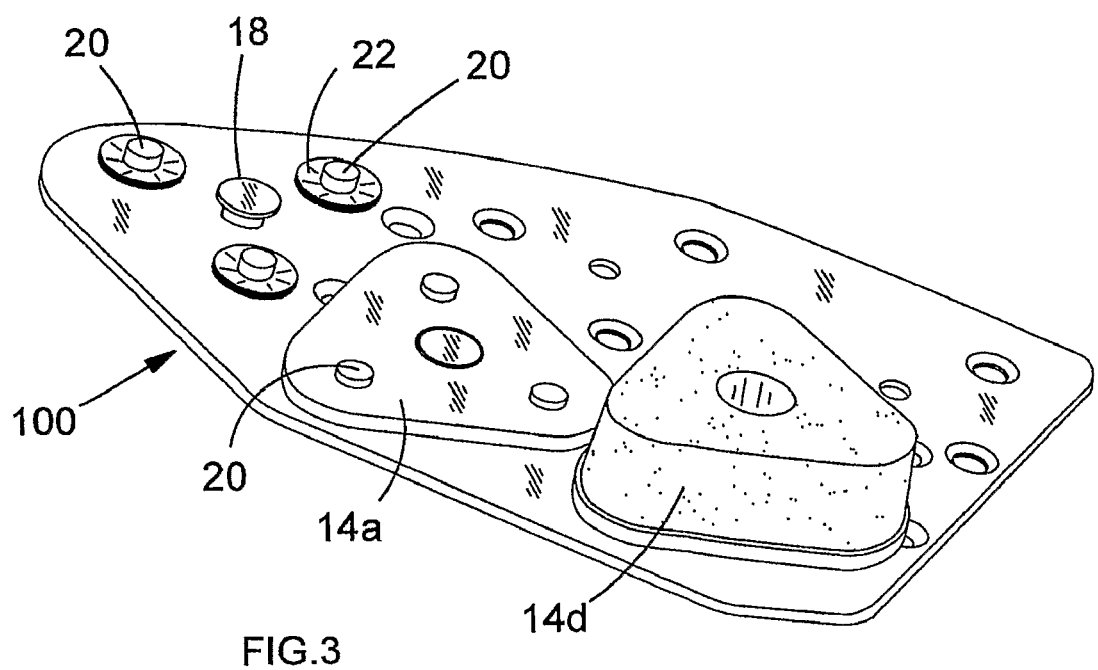
Figure 4:
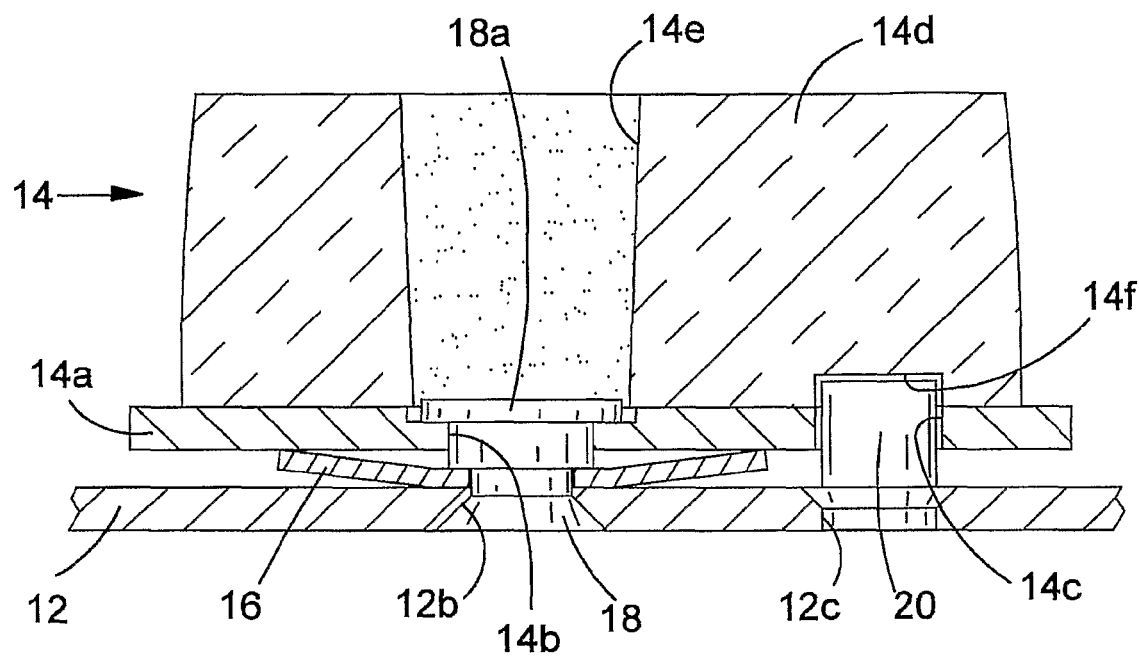
Figure 5:
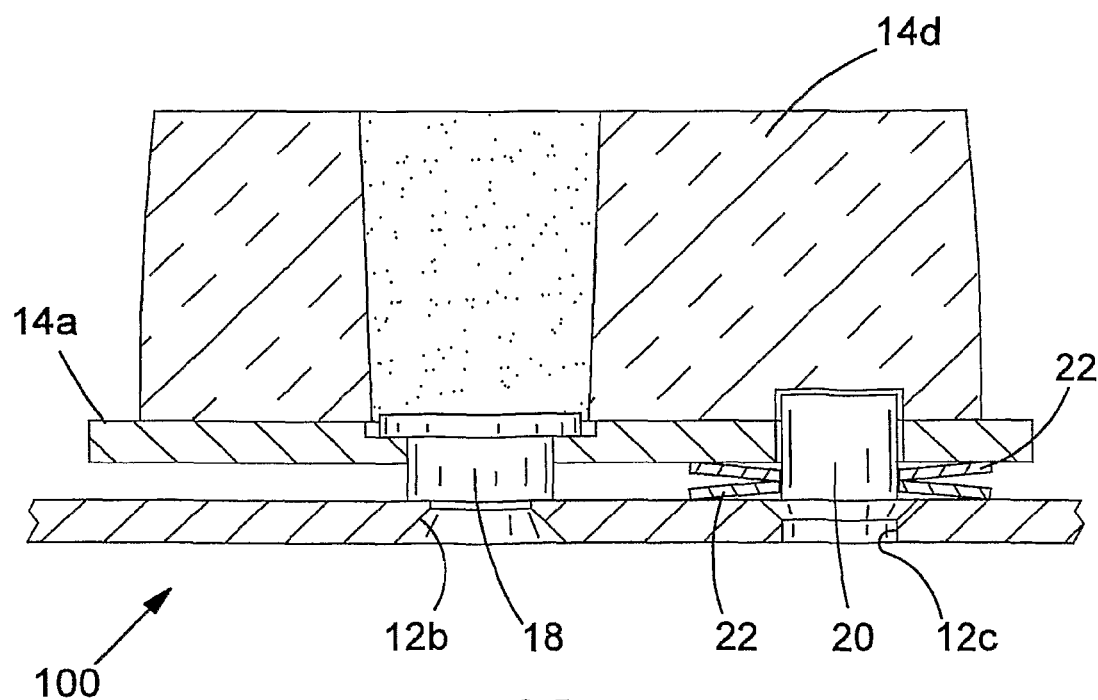

In the drawings:

FIG. 1: is a perspective view of the first illustrative pad assembly but can also serve to illustrate the second illustrative pad assembly since the two assemblies are identical in appearance when viewed from this direction;

FIG. 2: is a perspective view of the first illustrative pad assembly with parts omitted to enable the construction to be seen;

FIG. 3: is a similar view to FIG. 2 but of the second illustrative assembly;

FIG. 4: is a cross-sectional view, on a larger scale than FIGS. 1 to 3, taken through a portion of the first illustrative assembly; and FIG. 5: is a view similar to FIG. 4 but taken through the second illustrative assembly.

DETAILED DESCRIPTION

The first illustrative pad assembly 10 which is shown in FIGS. 1, 2 and 4 is for use in a disc brake. The assembly 10 comprises a carrier plate 12, five pads 14 mounted on the carrier plate 12, and spring means 16 acting between the carrier plate 12 and each of the pads 14.

The carrier plate 12 may be made of steel or cast iron or other suitable material. The carrier plate 12 has holes of three different types passing through it. Firstly, there are six holes 12a arranged in two rows of three which are provided so that screws (not shown) can pass though the holes 12a to secure the carrier plate to a mounting of a brake (not shown). Secondly, there are five holes 12b distributed over the plate 12. These holes 12b are provided to enable the pads 14 to be mounted on the carrier plate 12 as described below. Thirdly, there are fifteen holes 12c which are distributed in five groups of three with each group of three being distributed symmetrically about one of the holes 12b.

As the five pads 14 are identical in construction, only one need be described in detail. The pad 14 comprises a backing plate 14a which is best seen in FIG. 2.

The plate 14a is generally triangular when viewed in plan and has a central hole 14b therethrough and also three smaller holes 14c equally spaced about a hole 14b but remote therefrom, being nearer the periphery of the backing plate 14a than its geometrical centre and the centre of the hole 14b. The holes 14c are cylindrical through holes as can be seen from FIG. 4 but the hole 14b has a step in as is also visible in FIG. 4. This step is formed by an upper portion of larger diameter and a lower portion of smaller diameter. The holes 14b and 14c are in the same relationship to one another as the holes 12b and 12c in the carrier plate 12 so that, when a hole 14c overlies a hole 12b, the hole 14c and 12c can be brought into overlying relationship.

The pad 14 also comprises a block of friction material 14d which is adhered to the upper surface of the backing plate 14a. The friction material is preferably of the sintered metal type which is particularly useful for use in railway vehicles but may be of another type, for example a resin bonded friction material bonded for example by phenolic resin. In FIG. 2, the friction material block 14d has been omitted from one of the two backing plates 14a shown. The friction material block 14d is also generally triangular and is slightly smaller than the backing plate 14a (although this is not necessarily the case). A hole 14e passes through the block of friction material 14d and communicates with the hole 14b in the backing plate 14a.

The pad 14 is mounted on the carrier plate 12 by means of a headed fastener 18 in the form of a rivet. This fastener 18 is set in one of the holes 12b in the carrier plate 12 so that it is fixed thereto and projects through the hole 14b in the backing plate 14a and has a head 18a on the other side of the backing plate 14a which fits into the enlarged portion of the hole 14b within the hole 14e in the friction material block 14d. The fastener 18 is a relatively loose fit in the hole 14b so that the pad 14 can make limited rocking, tilting or pivoting movement and/or linear movement relative to the carrier plate 12 to enable the upper surface of the block 14d to conform to a disc. Since the block of friction material 14d is generally triangular when viewed in a plane parallel to the carrier plate 12, which is also parallel to the plane of the disc when the assembly 10 is mounted in a disc brake, the block 14d conforms to the disc surface according to the well-known "milking stool" principle and also can move towards the carrier plate to equalise the pressure applied to each of the five pads 14.

The spring means of the assembly 10 comprises five conical spring washers 16 each of which encircles one of the fasteners 18 between the carrier plate 12 and the backing plate 14a of the associated pad 14. Each washer 16 is pre-tensioned by the fastener 18 which is fixed to the carrier plate 12. The washer 16 serves to centre the pad 14 on the fastener 18. The limited relative movement between the pad 14 and the carrier plate 12 takes place against the action of the washer 16. In a modification of the first illustrative pad assembly 10, the spring washer 16 may be replaced by a stack of such washers. It is also possible to use alternative forms of spring, including the resilient tongues mentioned above of EP 1318321. In the case of the assembly 10, all five washers 16 have identical spring characteristics but this may not be the case.

The assembly 10 also comprises fifteen force transmitting members 20 which are each arranged to transmit braking force applied to the pads 14 to the carrier plate 12. Each of the members 20 is fixed into one of the holes 12c through the carrier plate 12 so that the fifteen members 20 are grouped in five groups of three. Each group of three members 20 is distributed about one of the fasteners 18 in identical fashion to the distribution of the holes 14c about the hole 14b in the backing plate 14a of the associated pad 14.

Since all the force transmitting members 20 are identical, only one will be described in detail. The member 20 is in the form of a headless rivet fixed into a hole 12c through the carrier plate 12. The member 20 projects as a cylindrical pin normally to the carrier plate 12 and projects into a recess in the pad 14 which is formed by one of the holes 14c. As can be seen in FIG. 4, the member 20 projects right through the hole 14b and into a recess 14f in the friction material 14d. The member 20 is a close fit in the hole 14b but sufficient clearance is allowed for the relative movement between the pad 14 and the carrier plate 12 to be accommodated. However, when braking force is applied to the pads 14, the members 20 are engaged by the sides of the holes 14c and the force is transmitted by the members 20 to the plate 12.

It is to be noted that the arrangement of the holes 14c and the corresponding force transmitting members is chosen so as to be generally symmetrical relative to the centre of hole 14b in the backing plate 14a. By this is meant that the angular separation of at least two, and most preferably all, force transmitting members provided for a particular backing plate is generally equal, thus ensuring that that the force distribution is superior as compared to other possible arrangements. Ultimately, this makes the assembly as a whole less likely to fail.

Also, ideally, such are arranged nearer the periphery of the backing plate than the centre of hole 14b so that together, each of the force transmitting members is better capable of carrying the significant loads to which they will be exposed during the braking of the vehicle in which the arrangement is provided. Additionally, the force will be evenly distributed between each of the force transmitting members.

In an alternative to the assembly 10, the force transmitting members 20 may not project into recesses in the pad 14 but instead may engage edges thereof, in which (ideally) grooves, conforming at least partially to the cross-sectional shape of the force transmitting members, are provided. In other words, the members 20 associated with a particular pad 14 may project past the edges of the backing plate 14a. For example, each member 20 may engage the plate 14a at a central region of one of its sides. In some cases, a single member 20 may engage the edges of two adjacent plates 14a.

In the operation of the pad assembly 10, pressure between a disc and the upper surface of each block of friction material 14d causes the pad 14 to move relative to the fastener 18 against the action of the spring washer 16. As mentioned above, since the block of friction material 14d is generally triangular, the well-known "milking stool" principle applies so that force is evenly distributed over the block of friction material. The pad 14 may also move linearly towards the carrier plate to equalise the forces between the five pads 14 mounted on the same carrier plate 12. The braking forces applied by the disc to the pads 14 are transmitted through the members 20 so that the braking forces apply little or no stress to the conical spring washers 16.

The second illustrative pad assembly 100 is shown in FIGS. 3 and 5 and, as stated above, the assembly 100 looks identical to the assembly 10 in the view forming FIG. 1.

The assemblies 10 and 100 are identical to one another except in the form of the spring means acting between the carrier plates and the pads thereof. Accordingly, only the spring means of the assembly 100 will be described in detail. Like parts in the drawings of the two assemblies are given the same reference numbers.

In the assembly 100, each conical spring washer 16 of the assembly 10 is replaced by six conical spring washers 22 of a smaller size. These spring washers 22 are not positioned to encircle the fastener 18 but instead each encircles one of the members 20, there being two spring washers 22, one on top of the other, on each of the members 20 associated with each pad 14.

In modifications of the assemblies 10 and 100, there may be, on the same carrier plate 12, pads 14 with associated conical spring washers 16 while other pads have spring washers 22 associated with them. Furthermore, there may be one or two or more than three force transmitting members 20 acting with each pad 14.

What is claimed is:

1. A pad assembly for use in a disc brake, comprising:
a carrier plate;
a backing plate having two sides;
at least one friction pad secured to one of said sides of said backing plate;
the other of said two sides of said backing plate being mounted on said carrier plate by an intervening spring connection for enabling movement of said backing plate relative to said carrier plate against action of said spring connection in response to application of an external braking force to said disc brake in operation;
a plurality of force transmitting members secured to one of said carrier plate and said backing plate and projecting therefrom into position to engage the other of said carrier plate and said backing plate in response to said relative movement between said backing and said carrier plate exceeding a threshold limit, wherein the force transmitting members are operable to transmit the applied braking force between said carrier plate and said backing plate, and wherein at least two of said force transmitting members are generally equiangularly arranged about a geometric center of said backing plate; and
wherein said spring connection comprises one or more conical spring washers encircling each force transmitting member.

2. A pad assembly for use in a disc brake, comprising:
a carrier plate;
a backing plate having two sides;
at least one friction pad secured to one of said sides of said backing plate;
the other of said two sides of said backing plate being mounted on said carrier plate by an intervening spring connection for enabling movement of said backing plate relative to said carrier plate against action of said spring connection in response to application of an external braking force to said disc brake in operation;
a plurality of force transmitting members secured to said carrier plate and projecting therefrom into position to engage said backing plate in response to said relative movement between said backing and said carrier plate exceeding a threshold limit, wherein the force transmitting members are operable to transmit the applied braking force between said carrier plate and said backing plate, and wherein at least two of said force transmitting members are generally equiangularly arranged about a geometric center of said backing plate; and
wherein each force transmitting member is in the form of a pin fixed to said carrier plate.

3. An assembly according to claim 2 wherein said force transmitting members are arranged more proximate the periphery of said backing plate than the geometric center of the backing plate.

4. A pad assembly according to claim 3, wherein said force transmitting members project into recesses formed in said backing plate.

5. A pad assembly according to claim 2, wherein said backing plate is mounted on said carrier plate by means of a fastener fixed to said carrier plate, said fastener projecting through a hole in said backing plate and having a head on the other side thereof.

6. A pad assembly according to claim 5, wherein said spring connection comprises one or more conical spring washers encircling said fastener.

7. A pad assembly according to claim 6, wherein the pad assembly comprises a plurality of pads mounted on a plurality of backing plates, each mounted to a common carrier plate, and said spring connection associated with each pad has spring characteristics appropriate to each pad's position on said carrier plate.

8. A pad assembly according to claim 7, wherein said pad assembly comprises a plurality of said pads mounted on a plurality of said backing plates, each mounted to a common said carrier plate, and said spring connection associated with each said pad has different spring characteristics.

9. A pad assembly according to claim 2 wherein the force transmitting members project to engage the peripheral edges of said backing plate.

10. A pad assembly according to claim 9 wherein grooves are provided in the peripheral edges of said backing plate to at least partially receive said force transmitting members, said grooves conforming at least partially to the portion of the cross-sectional shape of the force transmitting members.

11. A pad assembly according to claim 2, wherein said friction pad is generally triangular when viewed in a plane parallel to that of said carrier plate.

\* \* \* \* \*